United States Patent [19]

Bednar

[11] 4,411,347
[45] Oct. 25, 1983

[54] PNEUMATIC CLUTCH

[75] Inventor: Thomas R. Bednar, Milwaukee, Wis.

[73] Assignee: The Falk Corporation, Milwaukee, Wis.

[21] Appl. No.: 280,318

[22] Filed: Jul. 6, 1981

[51] Int. Cl.³ .................... F16D 25/04; F16D 19/00
[52] U.S. Cl. .................................. 192/88 B; 192/76; 192/85 AT; 188/72.3; 188/366
[58] Field of Search ............... 192/88 B, 52, 75, 76, 192/85 AT; 49/477; 188/72.3, 216, 366, 367

[56] References Cited

U.S. PATENT DOCUMENTS

| | | | |
|---|---|---|---|
| 2,237,864 | 4/1941 | Fawick | 192/88 B |
| 3,777,868 | 12/1973 | Sugahara | 192/88 B |
| 4,197,930 | 4/1980 | Sugahara | 192/88 B |
| 4,335,075 | 6/1982 | Kackos | 49/477 |

FOREIGN PATENT DOCUMENTS

| | | | |
|---|---|---|---|
| 1098287 | 7/1955 | France | 192/88 B |
| 684261 | 12/1952 | United Kingdom | 192/88 B |

*Primary Examiner*—John E. Murtagh
*Assistant Examiner*—Richard E. Chilcot, Jr.
*Attorney, Agent, or Firm*—Quarles & Brady

[57] ABSTRACT

An inflatable flexible gland clutch has a gland secured to one of a pair of cooperating clutch elements. The gland mounts friction shoes and includes inflatable chambers which, when subjected to air under pressure, will move the gland to a position where the shoes engage the other clutch element. Other chambers formed in the gland will, when inflated, disengage the clutch by moving the clutch shoes away from engagement with the mating clutch element.

11 Claims, 7 Drawing Figures

PNEUMATIC CLUTCH

BACKGROUND OF THE INVENTION

This invention relates to pneumatic clutches, and particularly to a pneumatic clutch havng a flexible gland which is actuated to engage and to disengage the clutch.

Pneumatic clutches which have an inflatable rubber or elastomer gland to connect rotating parts are commonly used in marine propulsion systems to control the fore and astern direction of travel of the ship. In such clutches an annular gland is typically permanently connected about the outer perimeter of an annual clutch member connected to the prime mover. The outer peripheral surface of the gland typically mounts replaceable clutch wear elements such as friction shoes. When the gland is inflated from a source of air under pressure, the shoes are moved radially outwardly to engage the inner periphery of a second annular clutch element which is connected through a drive train to the propellers. When the clutch is thus engaged, power is transmitted from the prime mover to the propellers. To disengage the clutch, the air pressure is removed and the gland is allowed to deflate.

Because of the effect of centrifugal force acting on the gland and the friction shoes, there is a tendency of the shoes to engage the mating surface of the outer clutch element even when the gland has not been inflated. It is undesirable to allow the shoes to drag across the surface of the clutch element when the clutch should be disengaged. Therefore, some means for positively disengaging the shoes from the mating element is often required. Most typically, positive disengagement is accomplished by providing springs which retract the shoes when the air pressure is removed. An example of this approach is found in U.S. Pat. No. 2,331,180 issued Oct. 5, 1943 to Gasser. As the speed of operation of the clutch increases heavier springs are needed for disengagement. Thus, when springs are used for disengagement it may be necessary to change the springs to accommodate different applications of the clutch.

The purpose of my invention is to provide a pneumatic clutch, and a flexible gland for such clutch, in which air pressure is used to prevent engagement of the clutch as well as to engage the clutch.

SUMMARY OF THE INVENTION

In accordance with the invention there is provided a pneumatic clutch which includes a pair of clutch members and an inflatable gland connected to one of the clutch members and having friction surfaces engageable with the other clutch member, such gland having multiple inflatable chambers which are connectable with a source of air under pressure whereby inflation of a chamber will engage the clutch and inflation of another chamber will disengage the clutch.

Further in accordance with the invention there is provided such a pneumatic clutch in which, when the clutch is engaged, the chamber or chambers used for disengagement have an interior dimension in the direction of movement towards engagement which is greater than the interior dimension normal thereto.

The invention may further reside in an inflatable annular gland for a pneumatic clutch which includes at least three inflatable annular chambers arrayed across the width of the gland with a middle chamber being larger than the outside chambers, together with pneumatic fittings extending into the hollow interior of each compartment.

It is a principal object of the invention to provide a pneumatic clutch and a gland for such a clutch in which air under pressure will both positively engage and disengage the clutch.

It is another object of the invention to provide a pneumatic clutch in which positive disengagement of the clutch is accomplished without the need for complex mechanical elements.

It is a further object of the inventin to provide a pneumatic clutch which can be held by air pressure in a disengaged position against the centrifugal force which would tend to engage the clutch and thereby cause wear of the friction surfaces.

The foregoing and other objects and advantages of the invention will appear in the detailed description which follows. In the description reference is made to the accompanying drawings which form a part hereof and in which preferred embodiments of the invention are illustrated.

DETAILED DESCRIPTION OF THE PREFERRED EMBODIMENTS

Figure 1:
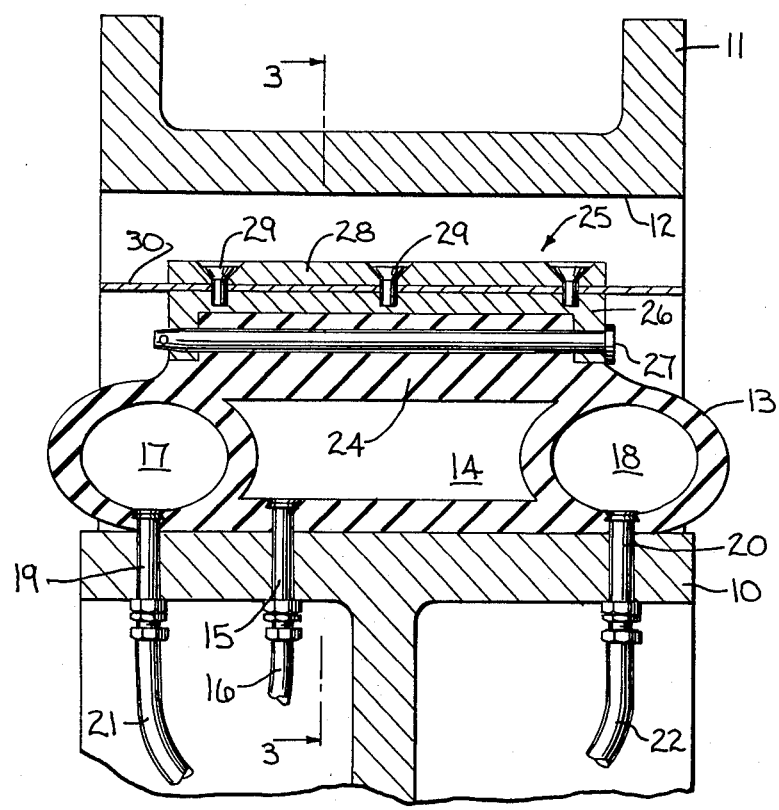
FIG. 1 is a view in vertical cross-section through a pneumatic clutch in accordance with the invention, with the clutch shown in a disengaged condition.

The clutch includes an annular inner clutch member 10 which is typically connected to a source of motive power and is, therefore, the driving clutch element. An outer concentric annular clutch element 11 has an inner clutch engaging surface 12. An annular gland 13 has its inner peripheral surface mounted upon and secured to the outer periphery of the driven clutch element 10. The flexible gland 13 is typically constructed of a reinforced rubber or other elastomer. It is formed with three hollow annular chambers. The middle chamber 14 is connectable to a source of compressed air by means of a hollow plug 15 which extends from the interior and through a wall of the middle chamber 14 and connects to an air pipe 16. The two outer chamber 17 and 18 are similarly connectable to a source of air under pressure by means of hollow plugs 19 and 20, respectively, connected to air pipes 21 and 22, respectively.

Figure 3:
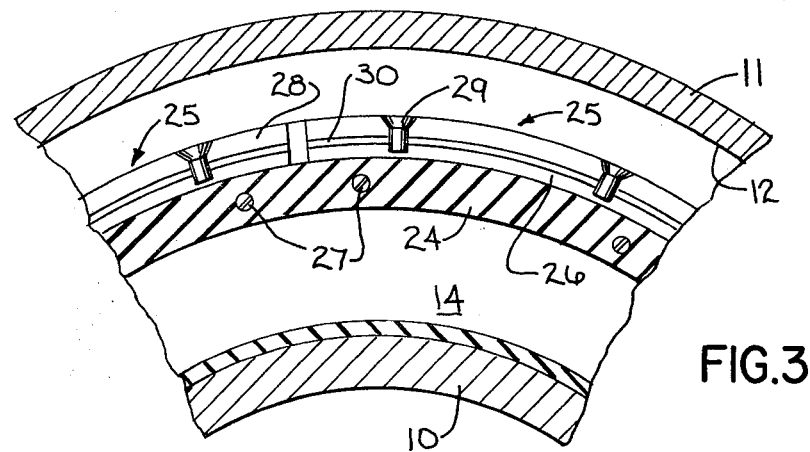
FIG. 3 is a partial view in cross-section taken in the plane of the line 3—3 of FIG. 1.

The outer wall 24 of the gland 13 is thicker than the remaining walls of the gland, particularly in the area of the middle chamber 14. This thicker wall 24 is used to mount friction shoes which include replaceable wear surfaces. Specifically, as shown in FIG. 3 a series of shoes 25 each include a base element 26 which has flanges on each side which extend over and surround the thickened wall 24 of the gland. The base elements 26 are held in position by a series of pins 27 which extend axially of the gland through the thickened wall 24. The pins 27 are headed on one end and are held in place by cotter pins on the other end. A shoe plate 28 is connected to the base element 26 by a series of screws 29. Interposed between the shoe plate 28 and the base element 26 is a thin sheet 30 which extends axially beyond the limits of the shoe plate 28 and the base element 26 and will function to dissipate some of the heat which is generated when the clutch is engaged.

FIG. 1 illustrates the clutch in a disengaged condition in which the friction shoes are out of engagement with the outer clutch member 11 so that power cannot be transmitted from the driving clutch member 10 to the driven clutch member 11. To engage the clutch, air under pressure would be admitted into the middle chamber 14 to inflate that chamber. Inflation of the middle chamber will continue until the friction shoes 25 engage the clutch surface 12 of the driven clutch element 11. The air pressure within the middle chamber 14 is maintained as long as it is desired to keep the clutch engaged.

Release of the air pressure in the middle chamber 14 should permit the natural reesiliency of the gland 13 to recover its normal shape and thereby move to a disengaged position. However, centrifugal forces acting on the flexible gland 14 and friction shoes tend to expand the gland so that the shoes will drag against the surface 12 of the driven clutch elements. Therefore, a mechanism is needed to insure that the friction shoes will not engage or drag over the clutch surface of the outer clutch member when the clutch is intended to be disengaged. Such a slipping and sliding action if is is permitted will shorten the life of the wear surfaces and could result in generating considerable heat.

The pneumatic clutch of this invention provides for the positive disengagement by means of the two outer inflatable chambers 17 and 18 of the gland 13. To disengage the clutch, air pressure is removed from the middle chamber and air under pressure is admitted into the two outer chambers 17 and 18 thereby causing those chambers to inflate. This will have the effect of collapsing the middle chamber 14 and will pull the shoes 25 radialy inwardly of the clutch.

The outer chambers 17 and 18 of the gland 13 must be so dimensioned that when the middle chamber 14 is inflated, the interior dimension of the outer chambers 17 and 18 in the direction towards engagement of the clutch (i.e., the dimension in the radial direction) is greater than the interior dimension at right angles thereto (i.e., the dimension in axial direction). This can be accomplished by so shaping the outer chambers that when no chamber of the gland is inflated the radial dimension is greater than the axial dimension. Alternately, the outer chambers can be so shaped that when the gland is uninflated the dimensions are the same. The embodiment of FIGS. 1–3 is of the later form and the outer chambers 17 and 18 are shaped with a circular cross-section which is stretched out of shape when the middle chamber 14 is inflated.

Figure 2:
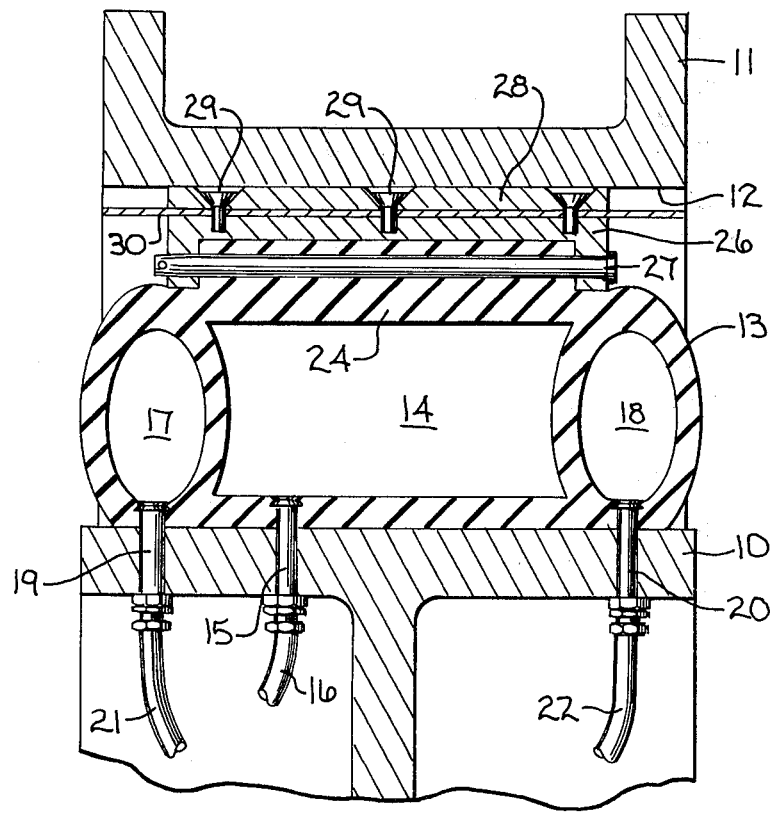
FIG. 2 is a view similar to FIG. 1 but showing the clutch in an engaged condition.
Figure 4:
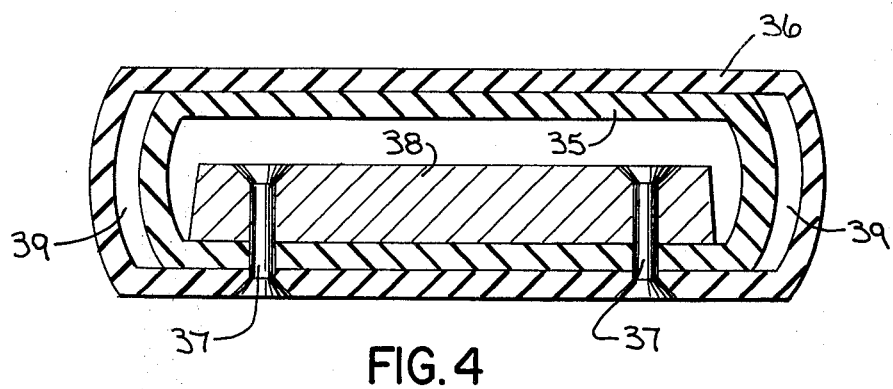
FIGS. 4 and 5 are views in vertical cross-section of alternate embodiments of a gland usable in the pneumatic clutch of the present invention.

While the preferred form of the flexible gland and its engaging and disengaging inflatable chambers is that illustrated in FIGS. 1–3, the gland can take several different forms. Specifically, it can be fabricated from several separate sections of inflatable tubes such as illustrated in FIG. 4. In the embodiment of FIG. 4, an inner tube 35 is mounted within an outer tuber 36 and is held in place by rivets 37 which extend through an inner plate 38. The interior of the inner tube 35, less the volume occupied by the plate 38, defines the middle chamber. The outer chambers 39 are defined by the spaces between the ends of the inner tube 35 and the ends of the outer tube 36.

Figure 5:
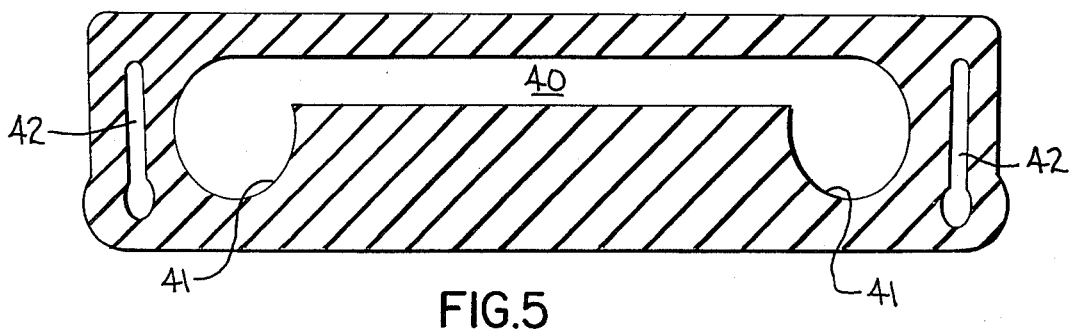

In the embodiment in FIG. 5, the middle chamber 40 has bulbous ends 41 and the outer chamber 42 are formed as thin pockets within the same flexible rubber or elastomer member.

Figure 6:
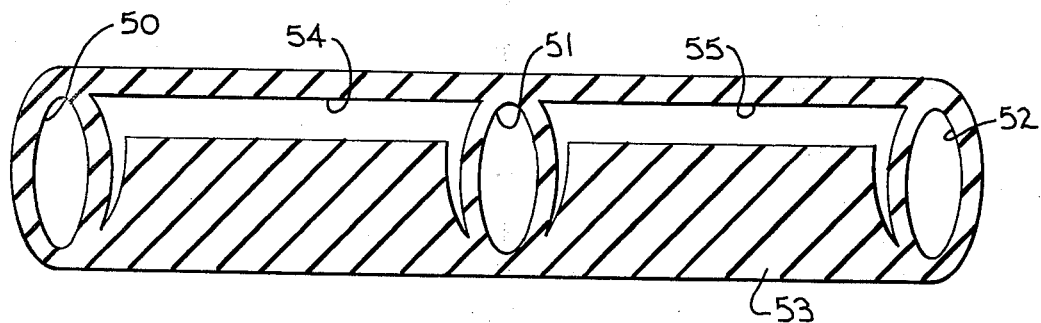
FIGS. 6 and 7 are views in vertical cross-section of a further embodiment of a gland usable in the pneumatic clutch of the present invention and illustrating the gland in clutch engaged and clutch disengaged conditions, respectively.
Figure 7:
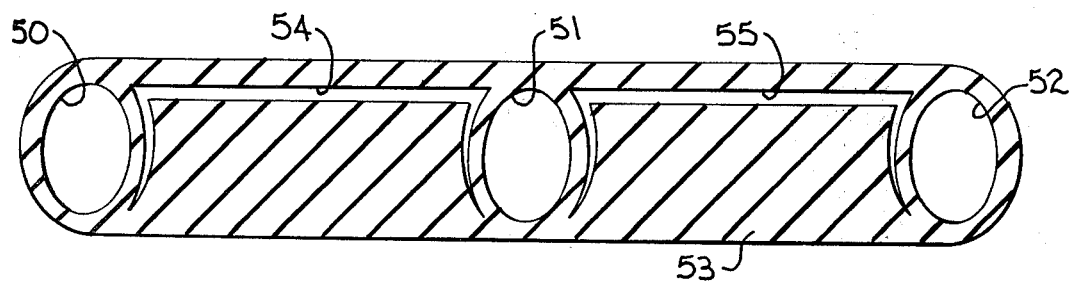

In the embodiments of FIGS. 6 and 7, a disengaging chamber is disposed in the middle of the gland with engaging chambers on either side. Specifically, there are three inflatable annular disengaging chambers 50, 51 and 52 formed at the mid-point and at each lateral side of a gland 53. A pair of inflatable engaging chambers 54 and 55 are formed in the gland 53 in the spaces between the chambers 50 and 51, and 51 and 52, respectively.

Other combinations of arrays of multiple chambers can be employed with certain of the chambers functioning when inflated to engage the clutch and others being employed when inflated to disengage the clutch.

In the embodiments of FIGS. 4 through 7, the disengaging chambers are elongated in the radial direction in their rest state.

In all of the embodiments, the chambers may be formed by molding techniques which employ fillers with interconnecting voids to form the interior of the chambers. When the chambers are described herein as being hollow, that term is intended to include an interior formed by a filler with interconnecting voids.

The invention has been illustrated and described in relation to a pneumatic clutch of the expandable gland type. That is the type which includes two concentric clutch elements with the gland mounted on the inner element and inflated to expand to engage the outer element. The invention may also be incorporated into a pneumatic clutch using a contracting or constricting gland. That is, the gland could be permanently attached to the inner periphery of the outer clutch element and would, upon inflation, have its opening contracting or constricting to thereby engage the outer periphery of the concentric inner clutch element. In such a constricting type clutch the friction shoes would obviously be mounted along the inner periphery of the gland. Furthermore, the invention may be incorporated into a pneumatic clutch in which the two clutch elements are mounted coaxially and have contronting surfaces normal to the axis of the clutch. In such an arrangement the flexible gland would be mounted on the surface of one clutch element and, upon inflation, would expand to engage the opposing surface of the other clutch element.

In all of these arrangements, the multiple chamber pneumatic clutch of the present invention can be advantageously employed to ensure positive disengagement of the clutch and to maintain the clutch in a disengaged condition against the effects of any forces tending to cause engagement.

What is claimed is:

1. A flexible inflatable annular gland for a pneumatic clutch, said gland having walls of an elastomer material which define at least three hollow annular chambers arrayed across the width of the gland, a middle chamber bing larger than the two outside chambers, pneumatic fittings extending into the hollow interior of each chamber, and replaceable friction shoes mounted about the other perimeter of the gland.

2. A pneumatic clutch comprising:
a pair of clutch members; and an inflatable gland mounted on one of said clutch members and having friction surfaces engageable with the other clutch member to engage the clutch, said gland having a plurality of hollow chambers each connectable to a source of air under pressure to inflate selected ones of the chambers to engage the clutch and to inflate others of the chambers to disengage the clutch.

3. A pneumatic clutch comprising:

a pair of clutch members; and an inflatable gland mounted on one of said clutch members and having friction surfaces engageable with the other clutch member to engage the clutch, said gland having a first hollow chamber connectable to a source of air under pressure to said first chamber to thereby engage the clutch, said gland having a second hollow chamber connectable to a source of air under pressure to inflate said second chamber to thereby disengage the clutch.

4. A pneumatic clutch in accordance with claim 3 wherein, after inflation of the first chamber, the dimension of the interior of the second chamber in the direction of movement between engagement and disengagement is greater than the dimension normal thereto.

5. A pneumatic clutch comprising:

driving and driven rotatable clutch members, and an inflatable flexible gland mounted on one side to said driving clutch element and mounting friction shoes on its other side, said gland having a hollow middle chamber connectable to a source of air under pressure to inflate said middle chamber and to thereby engage said friction shoes with said driven clutch members, said gland also having a pair of hollow outer chambers connectable to a source of air under pressure to inflate said outer chambers and to thereby hold said friction shoes out of engagement with said driven clutch members.

6. A pneumatic clutch in accordance with claim 5 wherein said clutch members comprise concentrically disposed annular members with said driving member being within said driven member, and where said gland is mounted about an outer perimeter of said driving member and said friction shoes engage with an inner peripheral surface of said driven member.

7. A pneumatic clutch in accordance with claim 6 wherein the interior dimension of said outer chambers in a radial direction is greter than the interior dimension in the axial direction when the middle chamber is inflated.

8. A pneumatic clutch comprising:

a pair of clutch members; and an inflatable gland mounted on one of said clutch members and having friction surfaces engageable with the other clutch member to engage the clutch, said gland having a hollow middle chamber connectable to a source of air under pressure to inflate the middle chamber and engage the clutch, said gland having a pair of hollow outer chambers connectable to a source of air under pressure to inflate the outer chambers and to thereby disengage the clutch.

9. A pneumatic clutch in accordance with claim 8 wherein the dimension of interior of the outer chambers in the direction of movememnt between engagement and disengagement is greater than the dimension normal thereto after inflation of said middle chamber.

10. A pneumatic clutch in accordance with claim 9 wherein said greater dimension results from distortion of said outer chambers upon inflation of said middle chamber.

11. A pneumatic clutch in accordance with claim 9 wherein said greater dimension is present both before and after the inflation of said middle chamber.

* * * * *

UNITED STATES PATENT AND TRADEMARK OFFICE
CERTIFICATE OF CORRECTION

PATENT NO. : 4,411,347
DATED : October 25, 1983
INVENTOR(S) : Thomas R. Bednar

It is certified that error appears in the above—identified patent and that said Letters Patent is hereby corrected as shown below:

Col. 1, line 6, "havng" should be --having--.
Col. 2, line 11, "inventin" should be --invention--.
Col. 3, line 23, "reesiliency" should be --resiliency--.
Col. 4, line 6, "chamber" should be --chambers--.
Col. 4, line 63, "bing" should be --being--.
Col. 6, line 12, "greter" should be --greater--.
Col. 6, line 29, "movememnt" should be --movement--.

Signed and Sealed this

Fourteenth Day of February 1984

[SEAL]

Attest:

GERALD J. MOSSINGHOFF

Attesting Officer

Commissioner of Patents and Trademarks